March 4, 1969  J. H. STEPHENS  3,430,768
SEPARATION PROCESS
Filed Dec. 30, 1966
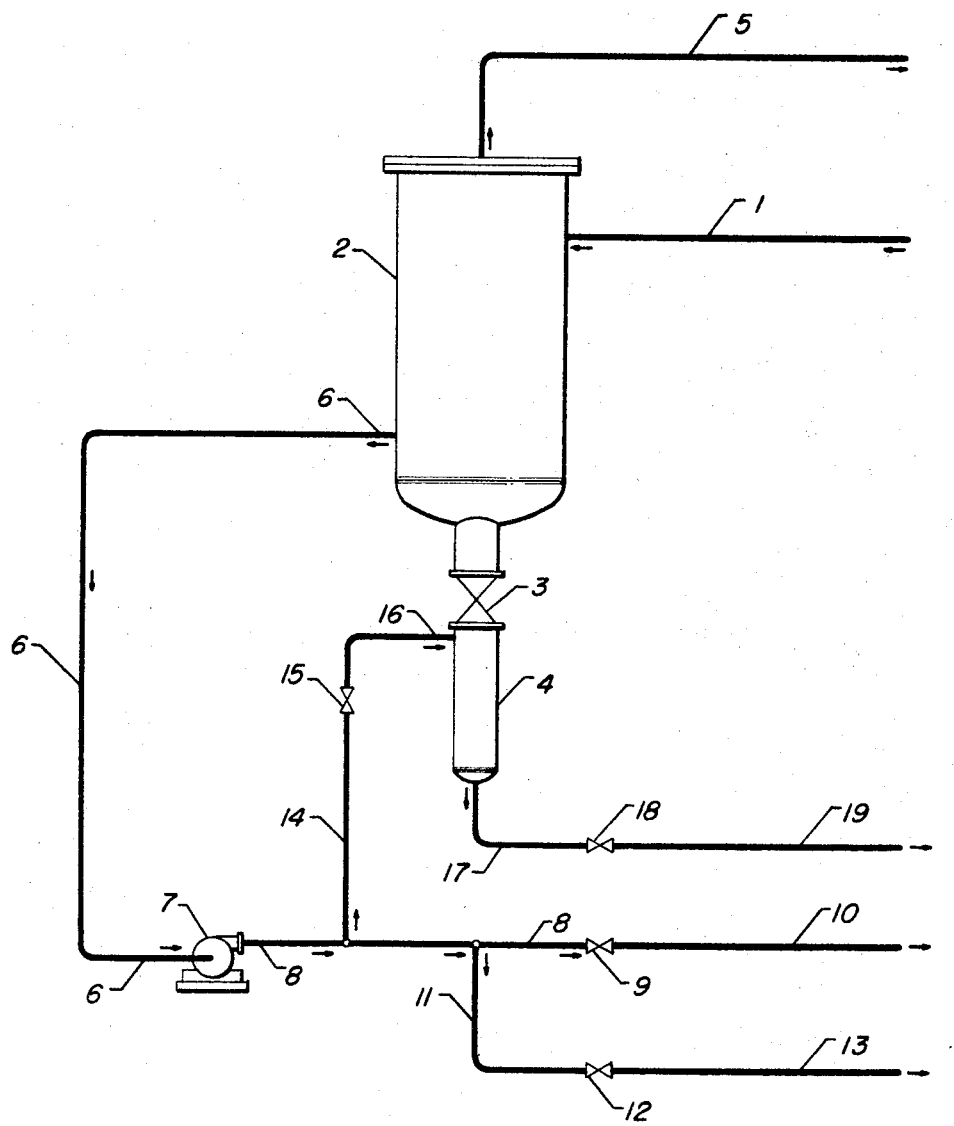
INVENTOR:
John H. Stephens
BY: James R. Hoatson, Jr.
Joseph E. Mason, Jr.
ATTORNEYS

United States Patent Office 3,430,768
Patented Mar. 4, 1969

3,430,768
SEPARATION PROCESS
John H. Stephens, Des Plaines, Ill., assignor to Universal Oil Products Company, Des Plaines, Ill., a corporation of Delaware
Filed Dec. 30, 1966, Ser. No. 606,133
U.S. Cl. 210—83                                6 Claims
Int. Cl. B01d 17/02

ABSTRACT OF THE DISCLOSURE

Process for recovery of a desired first liquid phase from a feed stream comprising two immiscible liquids wherein the feed stream is separated into the first liquid phase and a second liquid phase in a settling zone. The first liquid phase is accumulated in a collecting chamber within the zone, and is periodically isolated from the zone when a predetermined volume has been accumulated. The first liquid phase is recovered by being displaced from the collecting chamber by the introduction of either the feed stream or the second liquid phase into the collecting chamber at a pressure greater than that within the chamber. When the desired volume of first liquid phase has been recoverd, the introduction of the feed stream or second liquid phase into the collecting chamber is discontinued, and the chamber is recommunicated with the settling zone. Upon further accumulation of the first liquid phase within the chamber, the sequence of operational steps is repeated for further recovery of the desired first liquid phase.

---

The subject invention relates to the separation and recovery of two liquid phases from a settling zone, and more particularly from a settling zone which is maintained under vacuum. More specifically this invention relates to the recovery of two liquid phases from a settling zone by use of single pumping means employed in a novel manner.

In a fractionating column or other system which produces two immiscible liquid phases of material, it is normally desirable to remove the two phases from the separation zone individually. The removal may normally be accomplished by providing a pump on each liquid phase. If one phase is small in volumetric flow rate it is often difficult to find an inexpensive pump capable of the low flow rate, particularly when the pressure available at the suction to the pump is sub-atmospheric.

It is normal in the art when handling a low flow rate under vacuum to employ what is referred to as a "lock-box." The lock-box consists of a small vessel appended to the separation zone and valved at each end whereby the desired liquid phase can be admitted into the lock-box and isolated from the separation zone. When the lock-box is full of the desired liquid phase, it is isolated from the separation zone and a drain valve is opened to release the liquid inventory by venting the lock-box to the atmosphere.

Such an apparatus is unsatisfactory if the chemical within the separation zone is sensitive to oxygen since by reestablishing the isolation zone, or lock-box, in communication with the separation zone, air is admitted to the separation zone. As an alternative it may be desirable to provide that the lock-box will be subsequently purged with an inert gas such as nitrogen or that the inert gas may be employed to directly pressure the desired liquid out of the lock-box.

When the lock-box or isolation zone is thereafter recommunicated with the separation zone, the air or inert gas contained therein will be introduced into the separation zone, and the admitted gas will suddenly impose upon the fractionating column or other operating unit a surge in pressure. If the fractionating column or other operating unit is at elevated pressure, the system pressure will suddenly drop when the atmospheric lock-box is readmitted to the system. If the system is under a vacuum, the pressure will suddenly rise when such an isolation zone is readmitted into the system. This problem is intensified in small fractionating columns, particularly when the fractionation is under vacuum, and the resulting distillate and bottoms compositions will be upset considerably by the admission of small amounts of air or inert gas.

It is an object of this invention to withdraw each of the two liquid phases from a settling zone, and more particularly to withdraw each liquid phase from the settling zone when under a vacuum.

It is still another objective to recover the two liquid phases from the settling zone in a more facile and economical manner.

It is a more specific objective to withdraw the two liquid phases from the settling zone by use of a single pumping means employed in a novel manner.

These objectives may be achieved by the process which is disclosed in the attached drawing which is illustrative of one embodiment of this invention.

In accordance with the practice of this invention, the desired objectives may be achieved by a process for the recovery of a desired first liquid phase from a settling zone containing the first liquid phase and a second liquid phase which comprises periodically isolating a predetermined volume of the desired first liquid phase in an isolation zone, displacing the desired first liquid phase from the isolation zone by introducing a part of said second liquid phase into the isolation zone at a pressure greater than the pressure of said isolation zone, and recovering the displaced first liquid phase.

These objectives may further be accomplished in a process for the recovery of a desired first liquid phase from a feed stream comprising said first liquid phase and a second liquid phase which comprises introducing said feed stream into a separation zone comprising a settling zone and an isolation zone; separating said feed stream within the settling zone under conditions sufficient to provide said first liquid phase and said second liquid phase; periodically isolating a predetermined volume of the desired first liquid phase in said isolation zone; displacing the desired first liquid phase from the isolation zone by introducing at least a part of said feed stream into said zone at a pressure greater than the pressure of said isolation zone; and recovering the displaced first liquid phase.

It is to be noted that the objectives of this invention may be accomplished by the two embodiments set forth hereinabove regardless of whether the first liquid phase is at a greater density than the second liquid phase or whether the first liquid phase is at a lower density than the second liquid phase.

A greater understanding of the process of the subject invention may be afforded by now referring to the attached drawing which comprises a simplified schematic flow diagram thereof.

In the process of this invention as embodied in the attached drawing, a mixed phase liquid stream enters the process of the invention via line 1. This liquid feed comprises the condensed organic chemicals and water from a fractionating column, not shown, and enters the process of this invention at a rate of 51.30 pounds per hour. The feed stream enters a settling zone 2 which is maintained at 120° F. and 250 mm. Hg absolute. The liquid within the settling zone separates into a two-phase system, the upper phase containing water and organic chemicals comprising sec-butyl alcohol, tert.-butyl alcohol, isobutylene, and diisobutylene and having a specific gravity of 0.717, and the lower phase consisting of an aqueous solution comprising sec.-butyl alcohol, tert.-butyl alcohol, diisobutylene and water and having a specific gravity of 0.870. In addition, non-condensable vapors are separated within the settling zone and leave settling zone 2 via line 5 which communicates the zone with vacuum ejectors, not shown. The gas leaves via line 5 at a rate of 0.14 pound per hour, at a temperature of 120° F., and a pressure of 240 mm. Hg absolute.

The aqueous phase which separates within settling zone 2 passes into the bottom of the settling zone and enters isolation zone 4 via valve 3. This aqueous phase accumulates within isolation zone 4, while the organic chemical phase settles above the aqueous phase, thus filling the upper region of isolation zone 4 and establishing a liquid level of organic chemical within settling zone 2.

The organic chemical liquid is withdrawn from settling zone 2 via line 6 at a rate of 50.85 pounds per hour, or at a rate of 8.50 gallons per hour, and enters a pumping means 7. Pump 7 increases the pressure of the organic phase from 250 mm. Hg absolute on the suction side to about 30 pounds per square inch gauge on the discharge side and discharges the organic stream into line 8. The discharged organic chemical stream passes via line 8 through valve 9 at a rate of 8.42 gallons per hour, or at a rate of 50.36 pounds per hour, and reenters the fractionating column, not shown, as reflux via line 10. A net organic chemical product leaves line 8 via line 11 through valve 12 and is withdrawn from the system via line 13 at a rate of 0.41 pound per hour or 0.08 gallon per hour.

As the feed continues to enter the settling zone the aqueous phase continues to accumulate in isolation zone 4. When the level of aqueous phase within isolation zone 4 reaches a predetermined height, valve 3 above is closed and valve 15 is opened. This imposes a positive pressure of 30 pounds per square inch upon isolation zone 4 by means of the organic chemical phase which is in line 8. As valve 18 is opened slightly the organic phase in line 8 passes in part via line 14, through valve 15, and through line 16 into isolation zone 4, thereby displacing the aqueous phase out of the zone via line 17, through valve 18, and out of the system via line 19. When the aqueous phase has been substantially displaced from isolation zone 4, valve 18 is closed. The zone now contains organic chemical under a pressure of 30 pounds per square inch. Valve 15 is then closed and valve 3 is then opened, thereby allowing the organic liquid within zone 4 to reach equilibrium of 250 mm. Hg absolute pressure with the organic phase which is above in the settling zone 2. Since the organic chemical is a continuous liquid phase there is no pressure surge of the system.

As the feed continues to enter the process via line 1, aqueous phase continues to separate out in the settling zone 2 and drop through valve 3 into isolation zone 4. As the volume of aqueous phase within zone 4 again accumulates and reaches the level predetermined, valve 3 is again closed and valve 15 is again opened. Valve 18 is again cracked open thereby allowing the aqueous phase to be once again displaced from the isolation zone 4 by the organic phase entering via line 16. When the aqueous phase has been substantially displaced from zone 4, valve 18 is closed again and the entire sequence of steps is repeated periodically as required to displace the aqueous phase from the process.

The average withdrawal rate of the aqueous phase is 0.31 pound per hour or 0.04 gallon per hour. At this low rate a pump for vacuum service is prohibitively expensive. Similarly, the net overhead rate for the organic chemical phase is only 0.49 pound per hour or 0.08 gallon per hour, but there is no problem with this low rate since a larger capacity pump is required for reflux and the net overhead product rate is easily provided as a continuous flow by providing a slip stream from the pump discharge as shown. In the present invention the aqueous phase accumulates in the isolation zone 4 for several hours until a predetermined volume, say 0.5 to 1.0 gallon, accumulates therein. At this time the sequence of steps providing the order of valve opening and closing as disclosed hereinabove is undertaken, either by manual means or by appropriate automation. By periodic repetition of this sequence of steps as herein disclosed the aqueous phase is withdrawn intermittently without the need of a separate pump for this service.

While the illustrative embodiment is in service on a distillation column, this invention may be practiced in other environments. For example, the separation may be in a vacuum flash chamber comprising the settling zone and the isolation zone where considerable vapor or non-condensable gas may be removed. Since the feed to such a chamber would be provided at an elevated pressure which is greater than the pressure of the isolation zone, the feed stream entering the process of this invention via line 1 could, therefore, be employed to displace the desired phase from the isolation zone in a manner equivalent to that described in the example above. Under such an operation the valve manifolding and piping changes which would be required are readily ascertainable to those skilled in the art.

It must similarly be noted that the illustrative embodiment is under a vacuum service, but it need not be specifically employed under vacuum. Transfer from one pressure level to a higher pressure level may be accomplished within the practice of this invention. It must also be noted that the illustrative embodiment discusses the withdrawal of an aqueous phase but that the aqueous phase is not specific to this invention. This invention is equally effective in transferring any liquid phase such as a corrosive chemical or a high temperature liquid where either high or low volume transfer rates might entail considerable operating problems for pumping, or might require high alloy pumps at prohibitive expense.

It must further be noted that the illustrative embodiment discloses the invention whereby the more dense phase is periodically withdrawn from the isolation zone. By proper modification of the apparatus disclosed herein the process of the invention is equally effective in periodically removing small volumes of the less dense phase by providing that the denser phase be introduced into the isolation zone to displace the less dense phase.

It must further be noted that the operating conditions indicated for the operation of this invention are not specific to the practice of the invention. The temperature and pressure under which this invention is operative will be dependent upon the chemical and physical characteristics of the two liquid phases. Among the properties which must be considered are the specific gravities of the two liquid phases and the boiling points of the two liquid phases as they are influenced by temperature and by pressure. The specific temperature and pressure ranges wherein the inventive process may be practiced for any specific two-liquid system are readily ascertainable by those skilled in the art.

The invention claimed:
1. Process for the recovery of a desired first liquid phase from a settling zone containing said first liquid phase and a second liquid phase, which comprises periodically isolating a predetermined volume of the desired first liquid phase in an isolation zone, displacing the desired first liquid phase from the isolation zone by introducing a part of said second liquid phase into the isolation zone at a pressure greater than the pressure of said isolation zone, and recovering the displaced first liquid phase.

2. Process of claim 1 wherein the density of said desired first liquid phase is greater than the density of said second liquid phase.

3. Process of claim 1 wherein the density of said desired first liquid phase is less than the density of said second liquid phase.

4. Process for the recovery of a desired first liquid phase from a feed stream comprising said first liquid phase and a second liquid phase which comprises:
- (a) introducing said feed stream into a separation zone comprising a settling zone and an isolation zone;
- (b) separting said feed stream within the settling zone under conditions sufficient to provide said first liquid phase and said second liquid phase;
- (c) periodically isolating a predetermined volume of the desired first liquid phase in said isolation zone;
- (d) displacing the desired first liquid phase from the isolation zone by introducing at least a part of said feed stream into said zone at a pressure greater than the pressure of said isolation zone; and,
- (e) recovering the displaced first liquid phase.

5. Process of claim 4 wherein the density of said desired first liquid phase is greater than the density of said second liquid phase.

6. Process of claim 4 wherein the density of said desired first liquid phase is less than the density of said second liquid phase.

References Cited

UNITED STATES PATENTS

| | | | |
|---|---|---|---|
| 689,366 | 12/1901 | Newbold | 55—172 X |
| 1,272,850 | 7/1918 | Robbins | 210—74 |
| 1,481,901 | 1/1924 | Hapgood | 210—74 X |
| 2,047,229 | 7/1936 | Samiran | 210—115 X |
| 2,307,078 | 1/1943 | Reed | 210—537 X |
| 2,413,430 | 12/1946 | Boone | 210—114 |
| 3,080,057 | 3/1963 | Mobley | 210—83 |
| 3,350,851 | 11/1967 | Crooks | 55—172 X |

REUBEN FRIEDMAN, *Primary Examiner.*

JOHN ADEE, *Assistant Examiner.*

U.S. Cl. X.R.

210—533